(12) United States Patent
Chambers

(10) Patent No.: US 7,676,537 B2
(45) Date of Patent: Mar. 9, 2010

(54) ADDRESS GENERATION METHOD FOR COMBINING MULTIPLE SELECTION RESULTS

(75) Inventor: Peter Chambers, Phoenix, AZ (US)

(73) Assignee: Micrel, Inc., San Jose, CA (US)

( * ) Notice: Subject to any disclaimer, the term of this patent is extended or adjusted under 35 U.S.C. 154(b) by 1198 days.

(21) Appl. No.: 11/237,165

(22) Filed: Sep. 27, 2005

(65) Prior Publication Data

US 2007/0083582 A1  Apr. 12, 2007

(51) Int. Cl.
G06F 7/50 (2006.01)
(52) U.S. Cl. .................. 708/670; 711/211
(58) Field of Classification Search ........... 708/670; 711/211
See application file for complete search history.

(56) References Cited

U.S. PATENT DOCUMENTS

| | | | | |
|---|---|---|---|---|
| 5,606,520 A | * | 2/1997 | Gove et al. | 708/491 |
| 5,612,911 A | * | 3/1997 | Timko | 708/670 |
| 5,963,220 A | * | 10/1999 | Lee et al. | 345/552 |
| 6,330,581 B1 | * | 12/2001 | Hale | 708/670 |
| 6,877,069 B2 | * | 4/2005 | Luick | 708/670 |
| 6,918,024 B2 | * | 7/2005 | Ishii | 708/670 |
| 2004/0225861 A1 | * | 11/2004 | Brognara et al. | 711/217 |

* cited by examiner

*Primary Examiner*—Tan V Mai
(74) *Attorney, Agent, or Firm*—Patent Law Group LLP; Carmen C. Cook

(57) ABSTRACT

A method in an integrated circuit for generating an address value having a contiguous address range from a first selection result and a second selection result each being an one-of-k selection result includes selecting multiple multiplication factors being power-of-two multiplication factors and the sum of the multiplication factors being equal to k; shifting the first selection result towards the most significant bit by each of the multiplication factors to generate multiple shifted input values where each shifted input value is shifted towards the most significant bit by one of the multiplication factors; adding the shifted input values and the second selection result; and generating the address value having a contiguous address range. The method can be extended to combine more than two selection results by applying the shifting and addition steps in a hierarchical manner.

9 Claims, 5 Drawing Sheets

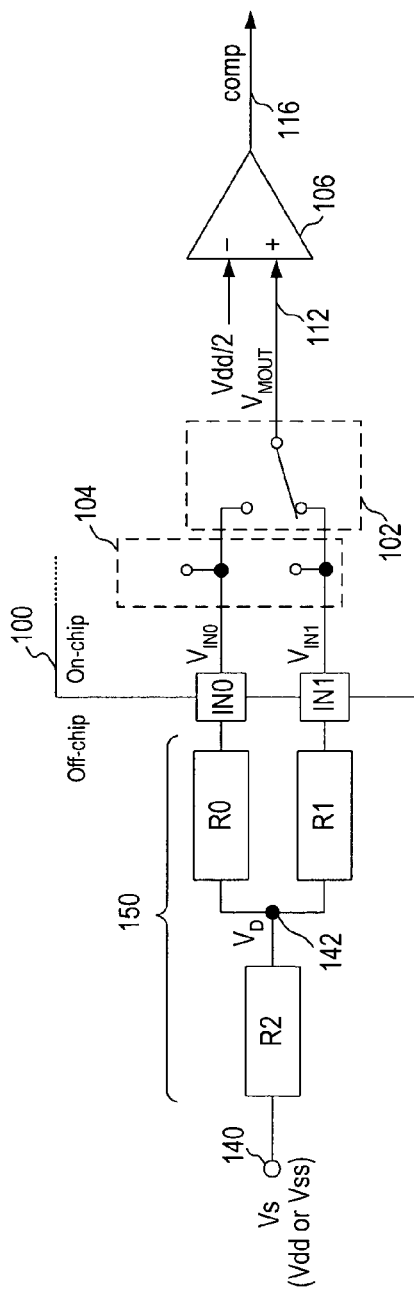
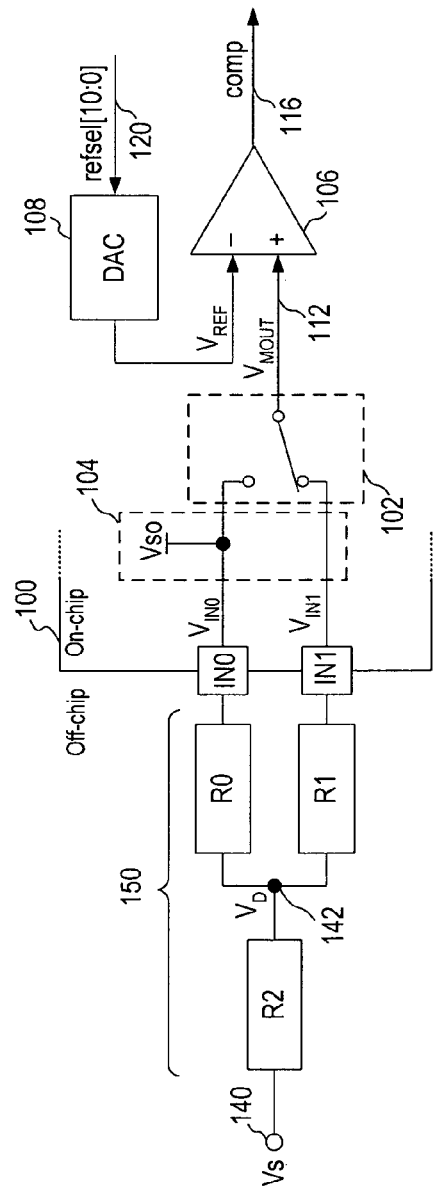
*Figure 2*
*Figure 3*

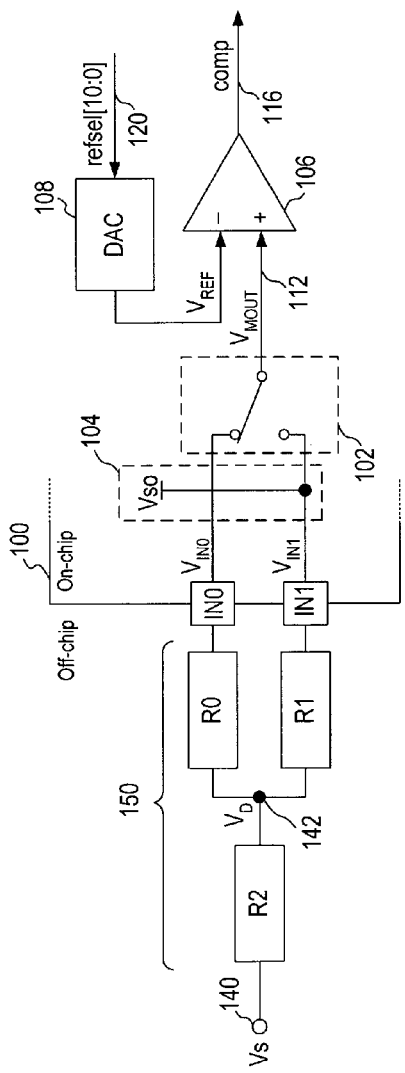
*Figure 5*
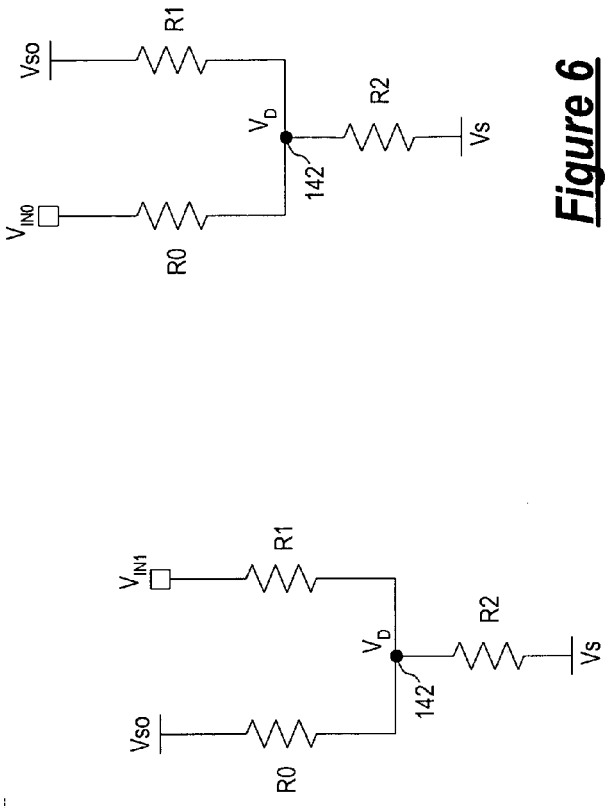
*Figure 6*
*Figure 4*

ADDRESS GENERATION METHOD FOR COMBINING MULTIPLE SELECTION RESULTS

CROSS-REFERENCE TO RELATED APPLICATION

This application is related to U.S. patent application Ser. No. 11/237,166, entitled "Analog Control of a Digital Decision Process," filed concurrently, by Ray Zinn et al., now U.S. Pat. No. 7,126,513, issued on Oct. 24, 2006, U.S. patent application Ser. No. 11/237,287, entitled "Power Saving Method In An Integrated Circuit Programming and Control Circuit," filed concurrently, by Thruston Awalt et al., now U.S. Pat. No. 7,245,148, issued on Jul. 17, 2007, and U.S. patent application Ser. No. 11/237,214, entitled "Programming and Control of An Integrated Circuit Using An Externally Connected Resistor Network," filed concurrently, by Paul Wilson et al., now U.S. Pat. No. 7,102,394, issued on Sep. 5, 2006, which patent applications are incorporated herein by reference in their entireties.

FIELD OF THE INVENTION

The invention relates to the programming and control of integrated circuits and, in particular, to a method for generating an address by combining multiple selection results received on multiple control pins.

DESCRIPTION OF THE RELATED ART

Integrated circuits (ICs) often have user selectable operating modes and the selection of a particular operating mode is often made by tying individual control pins to ground or to the positive power supply voltage (Vdd or Vcc). Several control pins are often used in concert to create a digital control word to allow a few pins to control various programmable functions on the integrated circuit. Binary input control logic, while simple to implement, fails to meet the needs of increasingly complex ICs because external control pins increase with the number of operating conditions being controlled.

Electronics systems possessing some level of intelligence, such as microprocessors or microcontrollers, can circumvent the pin count limitation by inputting data via a serial data port or a shared data bus. But not all ICs have the ability to manipulate data in this manner, and adding microprocessing circuitry would be adding unwarranted complexity to the core product.

An example of a simple product with complex programming needs is a multiple output low-dropout linear voltage regulator (LDO). In general, LDOs are offered in a variety of fixed output voltages. For instance, a given LDO may offer ten output voltage options, such as 2.5, 2.7, 2.8, 3.0, 3.2, 3.3, 3.6, 3.8, 4.0, and 5.0 volts. A dual output LDO can be formed capable of offering two output voltages being any combination of the aforementioned set of ten output voltages. Such a dual LDO IC would have 100 different operating modes and would need a way to select the 100 possible combinations. A triple output LDO would push the different operating modes to 1,000 selections.

Binary input control logic remains the programming technique in wide use today where tying one or more control pins to a logical high (Vdd or Vss voltage) or to a logical low (ground) selects the various operating options the IC offers. When the binary input control programming technique is used, the number of control pins required is N where $2^N$ is greater than the number of programmable options required. For example, 2 options can be programmed using 1 pin, 3-4 options can be programmed using 2 pins, 5-8 options can be programmed using 3 pins, and 9-16 options can be programmed using 4 pins, and so on.

When binary input control programming is used in a dual output LDO with 100 different operating modes, seven control pins ($2^7$=128) will be required. For a triple output LDO with 1,000 possible output voltage combinations, ten control pins ($2^{10}$=1024) will be required. However, with the package size of integrated circuits being a key consideration for use in consumer products, high pin counts defeat the advantages brought by placing several regulators in a single package because the package size is dominated by the number of control pins needed instead of the size of the silicon encapsulated inside.

Under the binary input control logic, each pin represents two digital states, each digital state associated with an operating mode. Programming techniques using a single control pin to represent more than two digital states are also known. Typically, a set of voltage levels between the positive power supply and ground are designed to represent a set of digital states which can be selected by a voltage applied to the control pin. In general, a resistive divider between the positive power supply voltage and ground is used to apply the desired voltage to the control pin and an analog-to-digital converter converts the input voltage to select one of multiple operating modes assigned to the pin.

When each input pin can represent more than a pair of digital stages, the total number of control pins required to program a given number of digital states can be significantly reduced. The table below illustrates the number of digital states that can be programmed on two, three or four control pins when each pin can represent two to ten digital states. As shown in the table below, three control pins each having 10 digital states capability can be used to select one of 1,000 possible operating modes. This represents a large pin count reduction as compared to the binary input control technique where 10 pins would be required to program 1,000 possible operating modes.

| Digital | Programming Pins | | |
| --- | --- | --- | --- |
| States | 2 | 3 | 4 |
| 2 | 4 | 8 | 16 |
| 3 | 9 | 27 | 81 |
| 4 | 16 | 64 | 256 |
| 5 | 25 | 125 | 625 |
| 6 | 36 | 216 | 1,296 |
| 7 | 49 | 343 | 2,401 |
| 8 | 64 | 512 | 4,096 |
| 9 | 81 | 729 | 6,561 |
| 10 | 100 | 1,000 | 10,000 |

The conventional technique for programming multiple digital states (or addresses) on a signal pin requires the use of high precision resistors (such as 1% tolerance resistors) in order to generate precise input voltage values. In general, a method for programming an integrated circuit that minimizes the number of package pins, power consumption and silicon area for a given number of digital codes is desired. Furthermore, reliable programming operation given a large resistor tolerance and variations in power supply conditions and temperature conditions is desired.

SUMMARY OF THE INVENTION

According to one embodiment of the present invention, a method in an integrated circuit for generating an address value having a contiguous address range from multiple selection results where each selection result is an one-of-k selection result includes: (a) selecting multiple multiplication factors, the multiplication factors being power-of-two multiplication factors and the sum of the multiplication factors being equal to k; (b) selecting a first selection result as a first input value; (c) selecting a second selection result as a second input value; (d) shifting the first input value towards the most significant bit by each of the multiple multiplication factors to generate multiple shifted input values where each shifted input value is shifted towards the most significant bit by one of the multiple multiplication factors; (e) adding the multiple shifted input values and the second input value; (f) generating an address output value; (g) selecting the next selection result as the first input value; (h) selecting the address output value as the second input value; and (i) repeating the steps of (d) to (h) until all selection results have been selected. The address output value generated by the addition of the last selection result and the address output value generated by shifting and adding of all previous selection results is the address value having a contiguous address range.

According to another aspect of the present invention, a circuit in an integrated circuit for generating an address value having a contiguous address range from multiple selection results where each selection result is an one-of-k selection result includes one or more computation stages, each computation stage receiving a first input value and a second input value and generating an output value and each computation stage includes an arithmetic-logic unit (ALU) shifter and an arithmetic-logic unit (ALU) adder. The ALU shifter applies multiple shifting operations to the first input value based on multiple multiplication factors where each multiplication factors is power-of-two multiplication factors and the sum of the multiplication factors is equal to k. The ALU shifter generates multiple shifted input values where each shifted input value is shifted towards the most significant bit by one of the plurality of multiplication factors. The ALU adder adds the multiple shifted input values and the second input value to generate the output value. The one or more computation stages include a first computation stage for receiving a first selection result and a second selection result as the first and second input values. The second to last computation stages, if any, each receives the next selection result as the first input value and the output value of the previous computation stage as the second input value. The output value of the only or the last computation stage is the address value having a contiguous address range.

The present invention is better understood upon consideration of the detailed description below and the accompanying drawings.

BRIEF DESCRIPTION OF THE DRAWINGS

FIG. 2 illustrates the circuit configuration of the address decoding circuit for determining the power supply voltage to which resistor R2 is coupled.

FIG. 3 illustrates the circuit configuration of the address decoding circuit for determining the resistance value of resistor R0.

FIG. 4 is an equivalent circuit diagram of the resistor network when configured to determine the resistance value of resistor R0.

FIG. 5 illustrates the circuit configuration of the address decoding circuit for determining the resistance value of resistor R1.

FIG. 6 is an equivalent circuit diagram of the resistor network when configured to determine the resistance value of resistor R1.

DETAILED DESCRIPTION OF THE PREFERRED EMBODIMENTS

In accordance with the principles of the present invention, an apparatus and a method for programming and control of an integrated circuit uses an off-chip resistor network coupled to two or more control pins and an on-chip address decoding circuit to select one of multiple programming states for the integrated circuit. The apparatus and method of the present invention allows multiple programming states to be assigned to each control pin so that a large number of programming states (or operating modes) of the integrated circuit can be programmed using a small number of control pins.

In one embodiment, the resistor network includes one resistor of fixed resistance value connected in series with two or more resistors having selectable resistance values. The selectable resistance values are selected from a predetermined set of resistance values corresponding to the number of digital stages which can be programmed. The selected resistance values of the two selectable resistors determine the programmed voltage to be applied to the integrated circuit. The fixed resistor has one terminal connected to the two variable resistors and another terminal which is connected to either one of the positive and negative power supply voltages. In this manner, the number of programmable states provided by each control pin is doubled.

In the present description, the term "positive power supply voltage" refers to a power supply voltage greater than the ground voltage. Typically, the positive power supply voltage in an integrated circuit is referred to as the Vdd or Vcc voltage. Furthermore, in the present description, the term "negative power supply voltage" refers to the ground voltage or a power supply voltage less than the ground voltage. Typically, the negative power supply voltage in an integrated circuit is referred to as the ground (GND) or Vss voltage.

Figure 1:
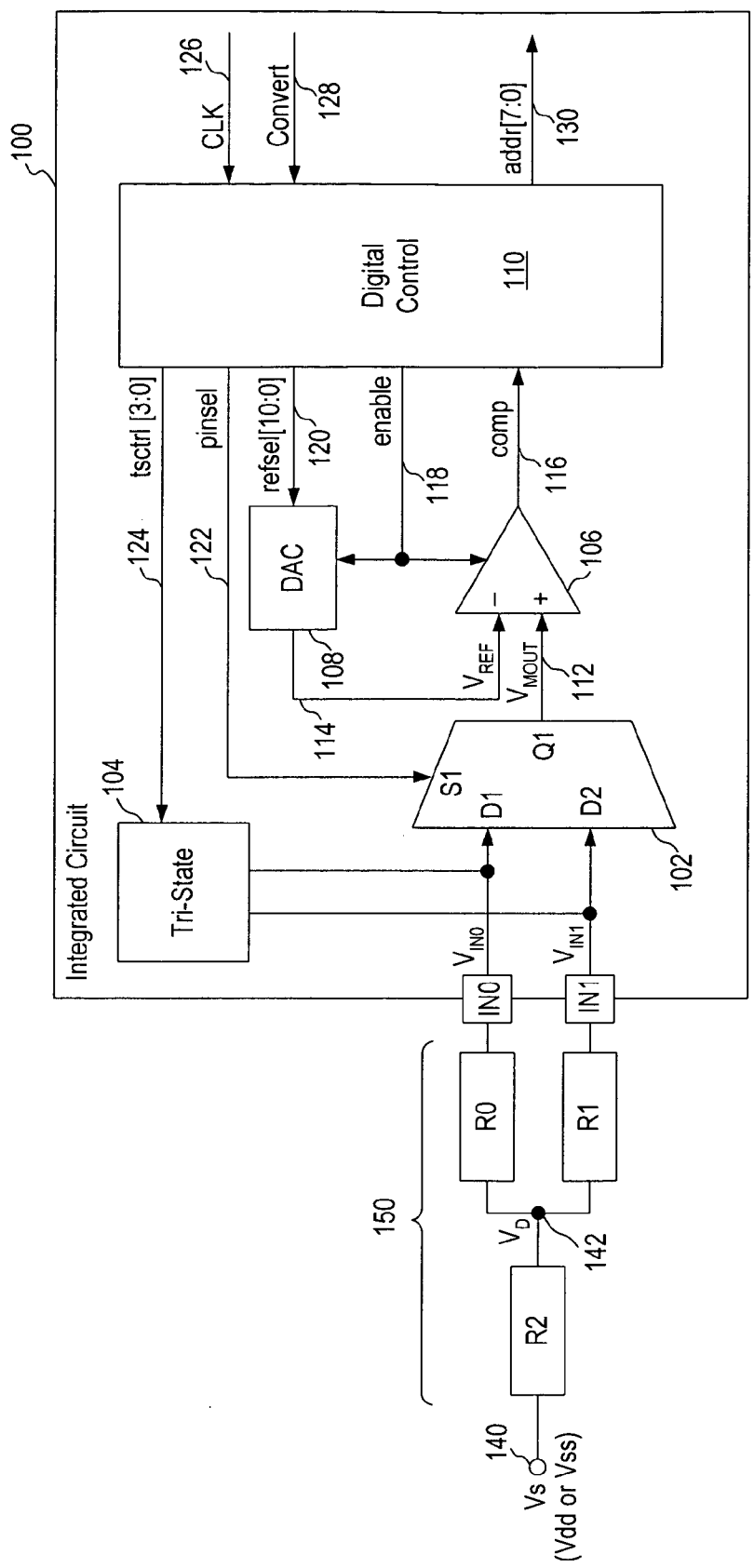
FIG. 1 is a schematic diagram of an integrated circuit (100) coupled to a resistor network (150) according to one embodiment of the present invention.

FIG. 1 is a schematic diagram of an integrated circuit coupled to an off-chip resistor network according to one embodiment of the present invention. Referring to FIG. 1, an integrated circuit 100 has multiple user selectable operating modes. Each operating mode is associated with a digital state and an n bit address signal addr[n−1:0] is used to address or select one of the multiple digital states of integrated circuit 100. For an n bit address signal addr[n−1:0], the number of possible digital states is $2^n$. In the present embodiment, it is assumed that the integrated circuit has 256 operating modes or digital states and the address signal is therefore an eight bit signal addr[7:0].

In integrated circuit 100, the desired digital state is selected by coupling a resistor network 150 having user-selected resistance values, to a pair of control pins IN0 and IN1 of integrated circuit 100. In accordance with the present invention, each control pin IN0 or IN1 is assigned to more than two digital states so that each control pin operates to represent multiple operating modes of the integrated circuit. Furthermore, in accordance with the present invention, the resistor network has a selectable power connection so that the operating modes that can be represented by each control pin is doubled, as will be described in more detail below. In the present embodiment, each control pin is assigned to 12 digital states. The total number of digital states that can be represented by the two control pins is therefore 12×12=144. The power connection of the resistor network further doubles the total number of digital states that can be represented by the two control pins to 288, exceeding the 256 digital states required by integrated circuit 100.

To determine the user-selected operating mode, integrated circuit 100 includes an on-chip address decoding circuit coupled to the control pins IN0 and IN1 to decode the power connection and the resistance values of the resistor network coupled thereto and to generate the address signal addr[7:0]. The address decoding circuit in integrated circuit 100 therefore includes the circuitry shown in FIG. 1 between the input terminals IN0 and IN1 and the address signal addr[7:0]. The remaining circuitry in integrated circuit 100 receiving the address signal addr[7:0] is not shown in FIG. 1.

In the present embodiment, resistor network 150 is an off-chip resistor network including three resistors connected between a power supply voltage node 140 and control pins IN0 and IN1. Specifically, a resistor R2 is connected between power supply voltage node 140 and a node 142. Power supply voltage node 140 realizes the power connection option of resistor network 150. Power supply voltage node 140, having a voltage Vs, is selected from either the positive power supply voltage Vdd or the negative power supply voltage Vss (the Vss voltage is typically the ground voltage). Resistor R0 is connected between node 142 and input terminal IN0 while resistor R1 is connected between node 142 and input terminal IN1 of integrated circuit 100. The resistance of resistor R2 is a fixed value while the resistance values of resistors R0 and R1 are user selectable among a set of resistance values. Specifically, the power connection of the power supply voltage node 140 of resistor R2 and the resistance values of resistors R0 and R1 in combination are used to select a desired digital state for integrated circuit 100.

To represent 12 digital states at each control pin IN0 and IN1, 12 voltage levels between the Vdd voltage and the ground voltage are required to represent the 12 digital states. Accordingly, the set of resistance values from which resistors R1 and R2 are selected includes 12 resistance values with each resistance value corresponding to one of the 12 voltage levels. In one embodiment, the set of 12 voltage levels between the power supply voltage Vdd and the ground voltage includes the voltage Vdd and the ground voltage. A set of 12 resistance values is selected to represent the 12 voltage levels. The 12 resistance values are within a range and are incrementally increasing from a first resistance value to a last resistance value within the range. Resistor R2 has a resistance value approximately mid-way in the range of resistance values for resistors R0 and R1. The absolute resistance values of the resistance range are selected based on variable factors including the number of voltage levels in view of the power supply voltages.

In one embodiment, the resistance values for resistors R0 and R1 are selected from a range of 0 ohms to 1 Meg ohms and resistor R2 is an 18 kΩ resistor. More specifically, in one embodiment, the resistances values for resistors R0 and R1 are selected from the following 12 commercially available resistor values: 0 Ω, 1.5 kΩ, 2.7 kΩ, 4.7 kΩ, 8.2 kΩ, 15 kΩ, 22 kΩ, 39 kΩ, 68 kΩ, 120 kΩ, 220 kΩ, and 1 MegΩ. Meanwhile, resistor R2 has a fixed resistance value at 18 kΩ. The resistors in resistor network 150 are typically 5% tolerance or better discrete resistors. In some embodiments, 1% tolerance discrete resistors can also be used.

In integrated circuit 100, the number of voltage levels (that is, the number of digital states) achievable is constrained by the power supply voltages (Vdd−Vss) and the offsets and inaccuracies of the circuit components. For example, comparator offset, potential divider mismatch, leakage currents, switch resistance, etc., can limit the accuracy of the address decoding circuit and therefore limit the number of voltage levels that can be provided within a given power supply voltage. For instance, if the power supply voltage is low, then the voltage difference between each voltage level is small. The address decoding circuit therefore requires a low offset comparator and small errors from the other sources. In one embodiment of the present invention, 12 levels are achieved with a power supply voltage of 1.8V.

When constructed as described above, resistor network 150 functions as a voltage divider and provides a first input voltage and a second input voltage to the first and second input terminals IN0 and IN1. The voltage divider of resistor network 150 generates output voltages (the first and second input voltages) that are proportional to the difference between the power supply voltages Vdd and Vss. Therefore, the first and second input voltages provide a good tolerance to changes in the power supply voltages at the comparison point.

Turning now to the on-chip decoding circuit in integrated circuit 100 for decoding the applied voltages provided by resistor network 150. In integrated circuit 100, first input terminal IN0 associated with a first input voltage $V_{IN0}$ and second input terminal IN1 associated with a second input voltage VIN, are coupled to a tri-state circuit 104 and a multiplexer 102. Specifically, tri-state circuit 104 is coupled to drive first input voltage $V_{IN0}$ and second input voltage $V_{IN1}$ in response to a tri-state control signal tsctrl[3:0] on a node 124. Tri-state circuit 104 provides individual control of first input voltage $V_{IN0}$ and second input voltage $V_{IN1}$. Tri-state circuit 104 either electrically floats the respective input voltage ($V_{IN0}$ and/or $V_{IN1}$) or drives the respective input voltage ($V_{IN0}$ and/or $V_{IN1}$) to either the power supply voltage Vdd or the ground voltage. In the present description, electrically floating a voltage or floating an input terminal refers to leaving the voltage or the input terminal electrically undriven. The electrically floated voltage or input terminal thus has no current flow.

Figure 7:
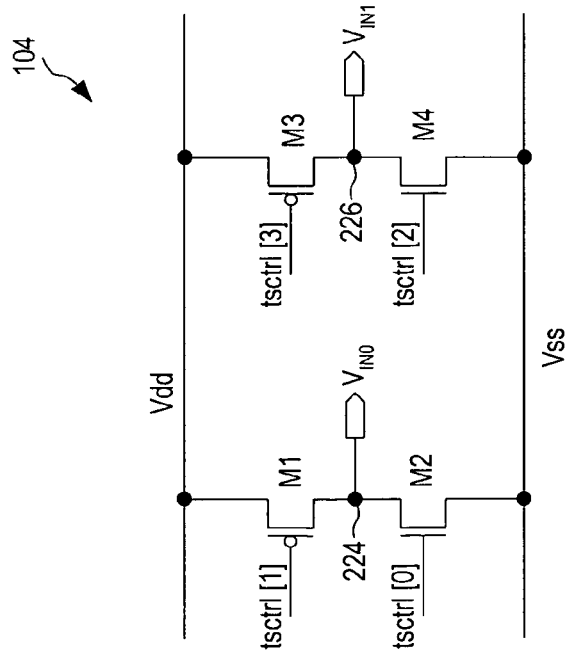
FIG. 7 is a circuit diagram of the tri-state circuit which can be used to implement the tri-state circuit in FIG. 1 according to one embodiment of the present invention.

In the present embodiment, tri-state control signal tsctrl[3:0] is a four-bit signal for controlling the various driving conditions of first input voltage $V_{IN0}$ and second input voltage $V_{IN1}$. FIG. 7 is a circuit diagram of the tri-state circuit which can be used to implement tri-state circuit 104 according to one embodiment of the present invention. Referring to FIG. 7, in the present embodiment, tri-state circuit 104 includes MOS transistors M1 to M4. PMOS transistor M1 and NMOS transistor M2 are connected in series between the power supply Vdd voltage and the Vss voltage to drive the first input voltage $V_{IN0}$ (node 224). Similarly, PMOS transistor M3 and NMOS transistor M4 are connected in series between the power supply Vdd voltage and the Vss voltage to drive the second input voltage $V_{IN1}$ (node 226).

The four-bit tri-state control signal tsctrl[3:0] operates to turn off both transistors in each pair of transistors M1/M2, M3/M4 to cause first input voltage $V_{IN0}$ or second input voltage $V_{IN1}$ to be left floating. Alternately, the four-bit tri-state control signal tsctrl[3:0] operates to turn on one transistor in a pair of transistors M1/M2, M3/M4 to cause first input voltage $V_{IN0}$ or second input voltage $V_{IN1}$ to be driven to the Vdd or Vss voltage. For example, when signal tsctrl[1] and signal tsctrl[0] are both deasserted, input voltage $V_{IN0}$ is left floating. When signal tsctrl[1] is asserted (logical low), transistor M1 is turned on and input voltage $V_{IN0}$ is driven to the power supply Vdd voltage. When signal tsctrl[0] is asserted (logical high), transistor M2 is turned on and input voltage $V_{IN0}$ is driven to the Vss voltage or the ground voltage. Of course, transistor M1 and M2 are never turned on at the same time. Transistors M3 and M4 operate in the same manner in response to control signals tsctrl[3] and tsctrl[2].

According to one aspect of the present invention, tri-state circuit 104 is used advantageous to reduce power consumption in integrated circuit 100. Specifically, when the desired address addr[7:0] has been obtained from the resistor network 105, tri-state circuit 104 can be instructed by control signal tsctrl[3:0] to float the input voltage $V_{IN0}$ and $V_{IN1}$ so that no current flows in the first input terminal IN0 or second input terminal IN1. In this manner, power dissipation by the resistors in the resistor address selection is eliminated.

Returning to FIG. 1, first and second input voltages $V_{IN0}$ and $V_{IN1}$ are also coupled to multiplexer 102 as first and second input signals D1 and D2. Multiplexer 102, in response to select signal pinsel on node 122, selects one of the two input signals D1 and D2 as the output signal Q1. An output voltage $V_{MOUT}$ on a node 112 is the selected voltage of the first and second input voltages $V_{IN0}$ and $V_{IN1}$. Tri-state control signal tsctrl[3:0] and multiplexer select signal pinsel are both generated by a digital control circuit 110.

The selected voltage $V_{MOUT}$ on node 112 is coupled to a comparator 106 to be compared with a reference voltage $V_{REF}$ (node 114). Specifically, voltage $V_{MOUT}$ is coupled to the positive input terminal and reference voltage $V_{REF}$ is coupled to the negative input terminal. Both the positive and the negative input terminals of comparator 106 are high impedance input terminals. Comparator 106 provides a comparator output signal comp as an output signal on a node 116. The comparator output signal is a 1-bit comparison result indicating whether the voltage $V_{MOUT}$ is greater than voltage $V_{REF}$.

A digital-to-analog converter (DAC) 108 generates the reference voltage $V_{REF}$ in response to a reference select signal refsel[10:0] on a node 120. In operation, DAC 108 generates a set of comparison voltage levels as the reference voltage $V_{REF}$. As described above, each of input terminals IN0 and IN1 is assigned to 12 voltage levels. To detect 12 voltage levels on the input voltage, 11 voltages are needed by the comparator. In accordance with the present invention, DAC 108 is capable of generating 11 comparison voltage levels where each comparison voltage level is the voltage midpoint of each pair of adjacent voltage levels of the 12 voltage levels assigned to the input voltages. Furthermore, the 11 comparison voltage levels are proportional to the difference between the power supply voltages Vdd and Vss so that the comparison voltage levels track variations in the power supply voltages in the same manner as the first and second input voltages $V_{IN0}$ and $V_{IN1}$ generated by the off-chip resistor network. Reference select signal refsel[10:0] is used to select one of the 11 comparison voltage levels to be used as the reference voltage $V_{REF}$.

Figure 8:
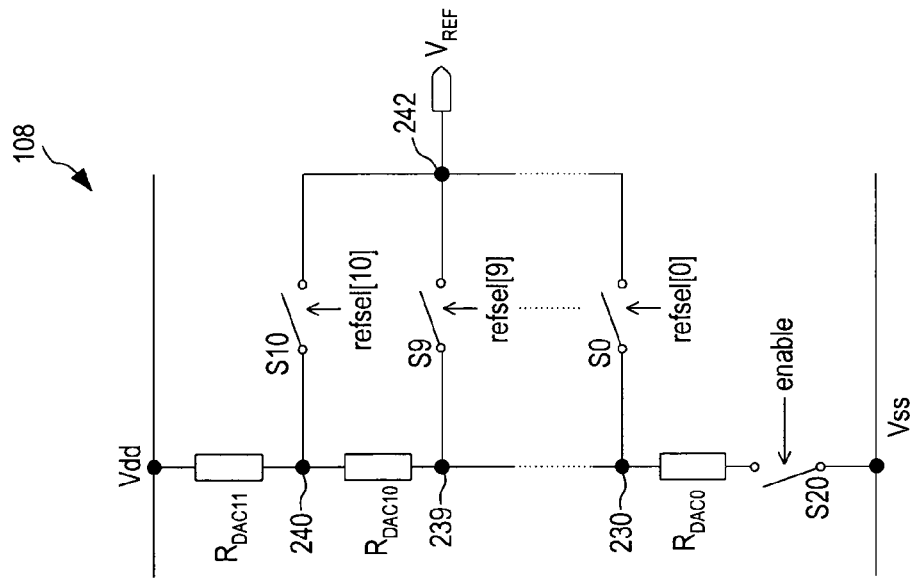
FIG. 8 is a circuit diagram of a digital-to-analog converter (DAC) which can be used to implement the DAC in FIG. 1 according to one embodiment of the present invention.

FIG. 8 is a circuit diagram of a digital-to-analog converter (DAC) which can be used to implement DAC 108 according to one embodiment of the present invention. Referring to FIG. 8, DAC 108 includes a resistor string forming a voltage divider between the positive power supply voltage Vdd and the negative power supply voltage Vss. The resistor string includes resistors $R_{DAC0}$ to $R_{DAC11}$ coupled in series between power supply voltages Vdd and Vss (through switch S20). The voltage divider formed by the resistor string thus provides 11 output voltages on nodes 230 to 240 where the output voltages are proportional to the difference between the power supply voltages Vdd and Vss.

In the present embodiment, a switch S20 is coupled between the Vss voltage and one terminal of the bottom resistor $R_{DAC0}$. Switch S20 is controlled by an enable signal and operates to disconnect the resistor string from the Vss voltage, thereby stopping current flow through the resistor string. Thus, DAC 108 is in normal operation when the enable signal is asserted to close switch S20 and DAC 108 is shut down when the enable signal is deasserted to open switch S20. When DAC 108 is shut down, power consumption by the circuit is reduced significantly as no current flows through the resistor string.

The resistance values of resistors $R_{DAC0}$ to $R_{DAC11}$ are chosen to select specific voltage values for the 11 output voltages on output voltage nodes 230 to 240. Specifically, the output voltage nodes 230 to 240 of DAC 108 establish the 11 comparison voltage levels and are selectively coupled to an output node 242 as the reference voltage $V_{REF}$ to be used by the comparator in the address decoding circuit of integrated circuit 100. In the present embodiment, output voltage nodes 230 to 240 are coupled through respective switches S0 to S10 to output node 242. Switches S0 to S10 are controlled by a respective bit of the reference select signal refsel[10:0]. For example, switch S1 is controlled by signal refsel[0] while switch S10 is controlled by signal refsel[10]. Thus, through the control of reference select signal refsel[10:0], one of the comparison voltage levels at nodes 230 to 240 will be selected and outputted as reference voltage $V_{REF}$.

It is well known that for resistors formed on silicon, the absolute resistance values of the resistors are typically not very precise while the resistance ratio can be made very precise. Thus, when a resistor string is used in DAC 108 to generate the comparison voltage levels, DAC 108 is capable of providing very accurate voltage values as output voltages where the output voltages are proportional to the difference between the power supply voltages Vdd and Vss (i.e. Vdd−Vss). The accuracy of the comparison voltage levels increases the accuracy of the address decoding operation and also lessens the resistance tolerance requirement for the external resistors. As described above, the first and second input voltages $V_{IN0}$ and $V_{IN1}$, generated by resistor network 150 also vary with the difference between the power supply voltages Vdd and Vss (i.e. Vdd−Vss). By ensuring that both the voltages to be compared (voltages $V_{IN0}$ and $V_{IN1}$) and the comparison voltage levels have the same voltage variations with respect to the power supply voltages, accurate voltage detection result can be obtained.

Returning to FIG. 1, DAC 108 provides the selected comparison voltage level as reference voltage $V_{REF}$ and comparator 106 compares the selected voltage $V_{MOUT}$ from multiplexer 102 with the reference voltage $V_{REF}$. The comparator output signal on node 116, being a 1-bit comparison result indicating whether the voltage $V_{MOUT}$ is greater than voltage $V_{REF}$, is coupled to digital control circuit 110.

Digital control circuit 110 includes digital circuitry implementing an algorithm for controlling the analogue electrical components of the address decoding circuit to determine the desired programming state selected on input pins IN0 and IN1. Digital control circuit 110 generates the tri-state control signal tsctrl[3:0], the multiplex select signal pinsel, the reference select signal refsel[10:0] and an enable signal. Digital control circuit 110 receives the comparator output signal comp and generates an address signal addr[7:0] on a node 130 indicative of the selected programming state. Address signal addr[7:0] is coupled to the internal, application-specific circuitry (not shown) of integrated circuit 100 as an address signal to indicate the desired programming state for integrated circuit 100. Digital control circuit 100 also operates to ensure suitable settling times for the analogue circuitry in response to changing operation states.

In the present embodiment, digital control circuit 110 also receives a clock signal CLK on a node 126 and a convert signal Convert on a node 128 from the application-specific circuitry of integrated circuit 100. Clock signal CLK can be used to synchronize the operation of digital control circuit 110 with the internal circuitry of integrated circuit 100. Convert signal Convert can be used to initiate a conversion process for obtaining the status of the resistor network 150. For instance, the internal application-specific circuitry may operate to interrogate the programmed state on input terminals IN0 and IN1 periodically to determine the current state of the resistor network so as to determine whether the desired programmed state selected by the resistor network has changed.

Digital control circuit 100 generates enable signal on node 118 to turn off DAC 108 and comparator 106 when the enable signal is deasserted. Specifically, integrated circuit 100 often requires to interrogate the programming state on input terminals IN0 and IN1 only periodically. Once the programming state is determined, the address decoding circuit can be turned off to conserve power. In accordance with one aspect of the present invention, the address decoding circuit implements a power conservation mode whereby the enable signal (node 118) is deasserted to turn off DAC 108 and comparator 106 so that no current flows in those circuitry. Furthermore, digital control circuit 110 generates tri-state control signal tsctrl[3:0] to cause tri-state circuit 104 to float first and second input voltages $V_{IN0}$ and $V_{IN1}$. Accordingly, no current flows through resistor network 150. By using enable signal to turn off the resistor string in DAC108 and to turn off comparator 106 and by floating input terminals IN0 and IN1, significant reduction in power consumption can be realized.

To determine the desired programming state selected on input pins IN0 and IN1, digital control circuit 100 implements an algorithm to determine the three variables of resistor network 150. Specifically, digital control circuit 100 first determines the power connection of the resistor network 150. Then, digital control circuit 100 determines the resistance values of resistors R0 and R1. For each determination step, digital control circuit 100 generates control signals tsctrl[3:0], pinsel, refsel[10:0] to control the analog components of the address decoding circuit. As a result of the separate determination steps, digital control circuit 110 receives three comparison results on comparator output signal comp from comparator 106. The three comparison results indicate the power connection of resistor network 150, the resistance value of resistor R0 or the voltage level selected by resistor R0, and finally, the resistance value of resistor R1 or the voltage level selected by resistor R1. Digital control circuit 110 combines the three comparison results to generate the 8-bit address signal addr[7:0] on node 130.

In operation, digital control circuit 110 generates a series of sequential events to supervise and control the operation of the on-chip address decoding circuit. The operation sequence of digital control circuit 110 is described in brief here and will be described in more detail below. Upon receiving the instruction to begin a conversion process via the Convert signal on node 128, digital control circuit 110 first determines the power connection of the resistor network 150, that is, whether R2 is connected to the Vdd voltage or the Vss voltage at node 140. After the determination step, digital control circuit 110 stores the determination result for future use. Digital control circuit 110 then uses the tri-state control circuit 104 and multiplexer 102 to allow the value of either resistor R0 or resistor R1 to be determined. Using the reference select signal refsel[10:0] on node 120 to control DAC 108, the digital control circuit incrementally changes the reference voltage $V_{REF}$ provided to comparator 106. At each step, digital control circuit 110 checks and stores the state of the comparator's output signal comp on node 116. Once the determination sequence has been performed for both resistors R0 and R1, the digital control circuit performs an internal logical mapping from the stored determination results to the resulting value presented as address signal addr[7:0] on 130. A variety of means are available to perform this mapping, including but not limited to lookup tables, logical derivation, or mathematical computation. At the end of the operation sequence, digital control circuit 110 places the system and itself into a quiescent condition, ready to begin another conversion process.

The operation sequence of the address decoding circuit under the control of digital control circuit 110 will now be described in detail. In one embodiment, the address decoding circuit employs the following operation sequence to determine the current programming state of integrated circuit 100 as selected by resistor network 150. For instance, digital control circuit 110 can be instructed by the internal circuitry of integrated circuit 100 to start a conversion process to ascertain, such as by asserting the Convert signal on node 128. The operation sequence of the address decoding circuit includes three steps: determining the power connection, determining resistance of resistor R0 and determining resistance of resistor R1.

The first step of the operation sequence of the address decoding circuit is to determine the power connection of resistor network 150. Specifically, the address decoding circuit determines whether power supply voltage node 140 of resistor R2 is connected to the Vdd voltage or the Vss voltage. FIG. 2 illustrates the circuit configuration of the address decoding circuit for determining the power supply voltage to which resistor R2 is coupled. First, digital control circuit 110 generates tri-state control signal tsctrl[3:0] to instruct tri-state circuit 104 to float first input voltage $V_{IN0}$ and second input voltage $V_{IN1}$. Thus, as shown in FIG. 2, voltages $V_{IN0}$ and $V_{IN1}$ are left undriven. Second, digital control circuit 110 generates the multiplexer select signal pinsel to select one of the first and second input voltages. For the purpose of this determination step, it is irrelevant whether the first input voltage $V_{IN0}$ or the second input voltage $V_{IN1}$ is selected. In the present illustration, the pinsel signal selects the second input voltage $V_{IN1}$ and the selected voltage $V_{MOUT}$ is coupled to comparator 106 to be compared with the reference voltage $V_{REF}$. Because the input terminals of comparator 106 are high impedance input terminals, no current flows from power supply voltage node 140 into the input terminal of comparator 106, thus the voltage Vs at node 140 appears at the positive input terminal (node 112) of comparator 106. Comparator 106 therefore compares voltage Vs with the reference voltage on the negative input terminal.

In the present embodiment, a voltage being one-half of the power supply voltage Vdd (Vdd/2) is used as the reference voltage $V_{REF}$. Specifically, digital control circuit 110 generates reference select signal refsel[10:0] to select a voltage level of the 11 comparison voltage levels that is equal to or nearest to Vdd/2. Voltage Vs, being either voltage Vdd or voltage Vss, is either greater than or less than the reference voltage. Comparator 106 thereby provides a first comparison result indicating whether voltage Vs is the Vdd voltage or the Vss voltage.

The second step of the operation sequence of the address decoding circuit is to determine the resistance value of resistor R0. FIG. 3 illustrates the circuit configuration of the address decoding circuit for determining the resistance value of resistor R0. First, digital control circuit 110 generates tri-state control signal tsctrl[3:0] to instruct tri-state circuit 104 to connect first input voltage $V_{IN0}$ to a power supply voltage that is opposite to voltage Vs as determined by the previous step. In FIG. 3, the power supply voltage that is opposite to voltage Vs is denoted as a voltage Vso. Thus, when voltage Vs has been determined to be the Vdd voltage, voltage Vso is the Vss voltage. When voltage Vs has been determined to be the Vss voltage, voltage Vso is the Vdd voltage. As shown in FIG. 2, voltage $V_{IN0}$ is connected to voltage Vso by tri-state circuit 104 while voltage $V_{IN1}$ is left undriven.

Second, digital control circuit 110 generates the multiplexer select signal pinsel to select the second input voltage $V_{IN1}$. The second input voltage $V_{IN1}$ is thus connected to comparator 106. As thus configured, resistors R2 and R0 form a voltage divider between the Vdd and Vss voltages providing a divided down voltage $V_D$ at node 142. Voltage $V_D$ is a function of the resistance ratio of resistors R0 and R2 with resistor R2 having a known resistance value. Thus, by sensing voltage $V_D$, the resistance value of resistor R0 can be determined. In the address decoding circuit of the present invention, the sensing of the voltage $V_D$ is accomplished by coupling undriven second input voltage $V_{IN1}$ to comparator 106.

FIG. 4 is an equivalent circuit diagram of the resistor network when configured to determine the resistance value of resistor R0. When second input voltage $V_{IN1}$, being undriven, is coupled to the positive input terminal of comparator 106, no current flows through resistor R1 due to the high impedance input of comparator 106. Thus, voltage $V_D$ appears at input terminal IN1 as voltage $V_{IN1}$.

Returning to FIG. 3, voltage $V_{IN1}$ is coupled as the selected voltage $V_{MOUT}$ to comparator 106 to be compared with the reference voltage $V_{REF}$. Comparator 106 compares voltage $V_D$ with the reference voltage on the negative input terminal. Digital control circuit 110 generates reference select signal refsel[10:0] to select each of the 11 comparison voltage levels in turn to be provided as the reference voltage $V_{REF}$ to comparator 106. By comparing voltage $V_D$ to each of the comparison voltage levels, the voltage level associated with voltage $V_D$ and therefore resistor R0 is determined. Comparator 106 thereby provides a second comparison result indicating the comparison voltage level associated with resistor R0.

The third step of the operation sequence of the address decoding circuit is to determine the resistance value of resistor R1. The operation steps for determining the resistance of resistor R1 is the same as the operation steps for determining the resistance of resistor R0 described above. FIG. 5 illustrates the circuit configuration of the address decoding circuit for determining the resistance value of resistor R1. First, digital control circuit 110 generates tri-state control signal tsctrl[3:0] to instruct tri-state circuit 104 to connect second input voltage $V_{IN1}$ to power supply voltage Vso being opposite to voltage Vs as determined in the previous step. Meanwhile, voltage $V_{IN0}$ is left undriven.

Second, digital control circuit 110 generates the multiplexer select signal pinsel to select the first input voltage $V_{IN0}$. The first input voltage $V_{IN0}$ is thus connected to comparator 106. As thus configured, resistors R2 and R1 form a voltage divider between the Vdd and Vss voltages providing a divided down voltage $V_D$ at node 142. Voltage $V_D$ is a function of the resistance ratio of resistors R1 and R2 with resistor R2 having a known resistance value. Thus, by sensing voltage $V_D$, the resistance value of resistor R1 can be determined. In the address decoding circuit of the present invention, the sensing of the voltage $V_D$ is accomplished by coupling undriven first input voltage $V_{IN0}$ to comparator 106.

FIG. 6 is an equivalent circuit diagram of the resistor network when configured to determine the resistance value of resistor R1. When first input voltage $V_{IN0}$, being undriven, is coupled to the positive input terminal of comparator 106, no current flows through resistor R0 due to the high impedance input of comparator 106. Thus, voltage $V_D$ appears at input terminal IN0 as voltage $V_{IN0}$.

Returning to FIG. 5, voltage $V_{IN0}$ is coupled as the selected voltage $V_{MOUT}$ to comparator 106 to be compared with the reference voltage $V_{REF}$. Comparator 106 compares voltage $V_D$ with the reference voltage on the negative input terminal. Digital control circuit 110 generates reference select signal refsel[10:0] to select each of the 11 comparison voltage levels in turn to be provided as the reference voltage $V_{REF}$ to comparator 106. By comparing voltage $V_D$ to each of the comparison voltage levels, the voltage level associated with voltage $V_D$ and therefore resistor R1 is determined. Comparator 106 thereby provides a third comparison result indicating the comparison voltage level associated with resistor R1.

It is instructive to note that while the first step of the operation sequence, determining the power connection of resistor network 150, should be performed first, the second and third steps of the operation sequence are interchangeable and it is irrelevant which of the resistance of resistors R0 and R1 is determined first.

Digital control circuit 110, upon receiving the three comparison results in turn, operates to combine the three comparison results to generate the associated address values for address signal addr[7:0]. In the present embodiment, each of input terminal IN0 and IN1 is assigned to 12 voltage levels. Therefore, the two input terminals provide 12×12=144 programmable digital states. The power connection option of voltage Vs doubles the programmable digital states to 288. However, in the present illustration, integrated circuit 100 uses only 256 digital states, selectable by the 8-bit address signal addr[7:0]. Thus, the combination of the power connection option and the resistance values of resistors R0 and R1 permits the selection of the 256 digital states required with 32 addresses remaining unused.

The integrated circuit address selection and digital state programming method of the present invention using an off-chip resistor network and an on-chip address decoding circuit provides many advantages over prior art address selection methods. First, the address selection and digital state programming method permits multiple states to be assigned to each control pin so that only a few number of pins is needed to program a large number of digital states. Thus, an IC with a large number of programming options can be implemented using fewer package pins. Second, the address selection method is simple to implement and does not require microprocessor or microcontroller circuits. Third, the digital state programming method of the present makes it possible to use low precision resistors, such as 5% tolerance resistors, to form the off-chip resistor network.

In the above described embodiments, a specific implementation of the address selection and digital state programming method is applied to an integrated circuit including two control pins IN0 and IN1, each assigned to 12 voltage levels. In other embodiments, the method of the present invention can be implemented using any number of control pins greater than two and each control pin can be assigned to any number of voltage levels as desired. The power connection option provides doubling of the digital states that are programmable by the control pins.

In one embodiment, when multiple control pins are provided to program an integrated circuit, the resistor network will expand to include the corresponding number of resistors connected between resistor R2 and the respective control pins. The tri-state circuit, the multiplexer, the DAC and the digital control circuit will also be modified accordingly to take into consideration of the total number of control pins. In essence, the number of control pins and voltage levels assigned per pin are application dependent and the method of the present invention can easily be adapted to suit any application without modifying the underlying principles.

Referring to FIG. 1, when multiple control pins are used, the resistor network will include multiple resistors R1 to RN each coupled between node 142 and a respective input terminal. A resistor R(N+1) having a fixed known resistance value is coupled between node 142 and the power supply voltage node 140 to function as resistor R2. When multiple control pins are used, determination of the power connection option of the resistor network operates in the same manner as described above and shown in FIG. 2. Determination of the resistance value of each of the resistors R1 to RN operates in the same manner as described above and shown in FIGS. 3 and 5 with the following modifications. The input terminals associated with all the control pins are left floating except for a first selected input terminal to be coupled to a power supply voltage opposite to the power supply voltage of the resistor network. The multiplexer selects a second selected input terminal whose associated input voltage is to be coupled to the comparator. In this manner, the resistance value of the resistor associated with the first selected input terminal is determined. The process can repeat in the same manner to determine the resistance values of all resistors R1 to RN.

Address Generation Method

In the above description, the integrated circuit address selection and digital state programming method of the present invention uses an off-chip resistor network coupled to two or more control pins and an on-chip address decoding circuit to select one of multiple programming states for the integrated circuit. In the above-described embodiments, the two control pins are each assigned to twelve programming states so that they combined to provide 144 programming states. The power connection option of the resistor network can be used to further double the total number of programming represented by the two control pins to 288. The address decoding circuit includes a digital control circuit to determine the desired programming state presented on the control pins. The digital control circuit detects the voltage conditions on the control pins and generates an 8-bit address signal addr [7:0] for the internal circuitry of the integrated circuit to select the desired programming state.

More specifically, the control pins are connected to the off-chip resistor network having specific resistance values for selecting the desired programming state. By using a resistance value selected from a set of twelve resistance values, each control pin provides one of twelve selection results associated with one of twelve possible programming states. In some applications, each control pin is used to control separate programming modes of the integrated circuit and therefore the one-of-twelve selection result from each control pin can be directed to control the separate programming modes. However, in some applications, such as the one illustrated in the present description, the two one-of-twelve selection results may be combined to generate an address value in a contiguous address range represented by programming states of the two control pins. In other words, two or more control pins are used in combination to select a particular address in a contiguous address range. When each control pin is assigned to twelve programming states, two control pins in combination can generate an eight-bit address addr[7:0] with 144 contiguous addresses from 0 to 143.

Figure 9:
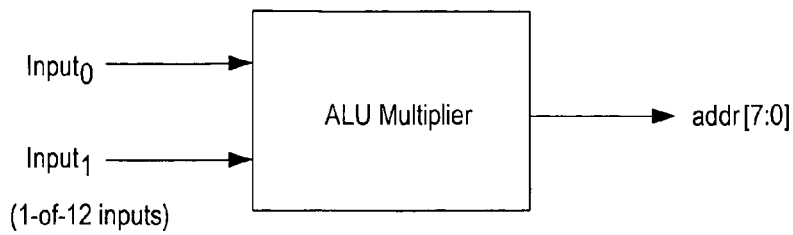
FIG. 9 is a block diagram illustrating a conventional method for combining multiple selection results to generate an address value.

A conventional method for combining selections results is to use an ALU (arithmetic-logic unit) multiplier as shown in FIG. 9. Referring to FIG. 9, two input selection results $Input_0$ and $Input_1$, each representing an one-of-twelve selection result, are coupled to an ALU multiplier to be combined to generate an output address value addr[7:0]. The output address is given as:

$$\mathrm{Addr}[7{:}0]=(12*Input_1)+Input_0. \qquad \mathrm{Eq.\ (1)}$$

Addr[7:0] has a linear address range from 0 to 143 from the two input selection results.

According to another aspect of the present invention, a circuit and method of generating an address value from a combination of multiple selection results utilizes shifting and adding functions to generate an address value having a contiguous address range. The address generation circuit and method is readily extensible to combine any number of two or more selection results to generate an N-bit address values having a contiguous address range from 0 to $2^n-1$.

One main advantage of the address generation circuit and of the present invention is that a simplified circuit architecture is realized. When implemented in silicon, ALU multipliers are large and expensive to implement and they often have slow speed of operation. By using only shifters and adders in the circuit of the present invention which are less complex to implement, the simplified circuit architecture of the present invention can be implemented using less silicon area, thereby reducing the manufacturing cost. The shifters and adders can usually be operated at faster speeds than multipliers. Furthermore, the simplified circuit architecture is optimized for combining multiple one-of-k selection results to allow the integrated circuit address selection and digital state programming method described above to be applied to a wide range of integrated circuit designs.

The circuit architecture for implementing the address generation circuit and method of the present invention is obtained by rewriting Equation (1) above as follows:

$$\mathrm{Addr}[7{:}0]=(8*Input_1)+(4*Input_1)+Input_0. \qquad \mathrm{Eq.\ (2)}$$

Although Equation (2) now appears to have two multiplication steps instead of a single multiplication step in Equation (1), the two multiplication steps are power-of-two multiplications which are trivial to implement in digital domain. Specifically, the two power-of-two multiplication steps in Equation (2) can be accomplished by a logical shift to the left (towards the most significant bit). Therefore, Equation (2) merely involves the computation steps of shifting and adding.

Figure 10:
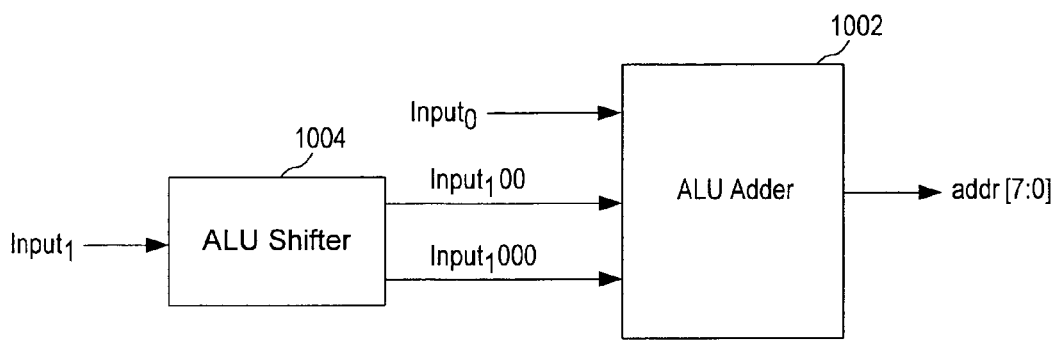
FIG. 10 is a block diagram illustrating a method for combining multiple selection results to generate an address value according to one embodiment of the present invention.

FIG. 10 is a block diagram illustrating a method for combining multiple selection results to generate an address value according to one embodiment of the present invention. Referring to FIG. 10, two input selection results Input$_0$ and Input$_1$ are to be combined to generate an address value addr[7:0]. First input selection result Input$_0$ is coupled directly to an ALU adder 1002. Second input selection result Input$_1$ is coupled to a shifter 1004 to be shifted to realize the multiply-by-4 and multiply-by-8 operations. First, the second input selection result Input$_1$ is shifted to the left by two places, corresponding to a multiply by four operation. Output value "Input$_1$00" denotes the multiplied-by-4 second input selection result. Second input selection result Input$_1$ is further shifted to the left by three places, corresponding to a multiply by eight operation. Output value "Input$_1$000" denotes the multiplied-by-8 second input selection result. Output values Input$_1$00 and Input$_1$000 are both coupled to ALU adder 1002. ALU adder 1002 adds the three input values to generate the desired address value addr[7:0]. Because ALU adders use simpler circuitry than ALU multipliers, the address generation circuit and method of FIG. 10 is more efficient to implement in silicon and the circuit operation is faster than the conventional implementations using ALU multipliers.

A salient feature of the address generation circuit and method of the present invention is that the circuit architecture can be readily extended to additional stages to handle combination of multiple input selection results. More specifically, the address generation circuit and method of the present invention is applied hierarchically where at each computation stage, an input selection result is shifted and added to the computed address value of the previous stage.

Figure 11:
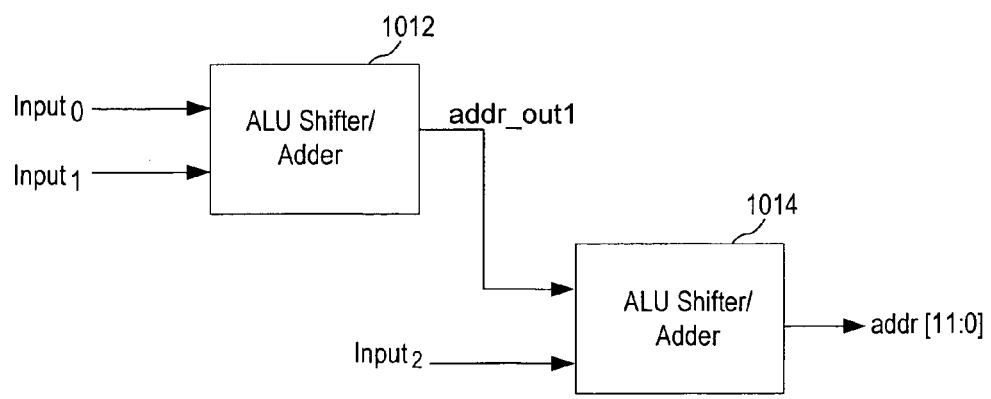
FIG. 11 is a block diagram illustrating a method for combining multiple selection results to generate an address value according to another embodiment of the present invention.

FIG. 11 is a block diagram illustrating a method for combining multiple selection results to generate an address value according to another embodiment of the present invention. Referring to FIG. 11, three input selection results, each being a one-of-twelve selection result, are being combined to generate a final 12-bit address value addr[11:0]. In the first computation stage, first input selection result Input$_0$ and second input selection result Input$_1$ are coupled to ALU shifter/adder 1012. Second input selection result Input$_1$ is shifted and added to first input selection result Input$_0$ to generate first stage address output value addr_out1. The first stage address output value addr_out1 is coupled to ALU shifter/adder 1014 forming the second computation stage. Third input selection result Input$_2$ is shifted and added to first stage address output value addr_out1 to generate the second stage address output value which is the final output address addr[11:0].

One of ordinary skill in the art, upon being apprised of the present description, would appreciate that the address generation circuit and method of the present invention can be extended to multiple stages to combine multiple input selection results. Furthermore, the address generation circuit and method of the present invention can be readily modified to accommodate input selection results having any number of selections per input. Specifically, the multiplication factors to be used, that is, the shifting operation, are modified to accommodate any one-of-k selection results. While some one-of-k selection results, such as one-of-twelve or one-of-eight, can be better optimized than others, the address generation circuit and method of the present invention can be implemented to improve the efficiency and speed of operation for all one-of-k selection results.

To apply the address generation circuit and method of the present invention to any one-of-k selection result, the value of k is broken down into two or more multiplication factors, each multiplication factor being a power-of-two multiplication factor. The sum of the multiplication factors being equal to k.

In this manner, only shifting operations and addition operations are required to combine the multiple one-of-k selection results to generate an address value having a contiguous address range.

Furthermore, in the above description, two multiplication factors are applied to shift one of the input selection results. In other embodiments, two or more multiplication factors can be used as long as the sum of the multiplication factors is equal to the number of selections k.

The above detailed descriptions are provided to illustrate specific embodiments of the present invention and are not intended to be limiting. Numerous modifications and variations within the scope of the present invention are possible. The present invention is defined by the appended claims.

I claim:

1. A method in an integrated circuit for generating an address value having a contiguous address range from a plurality of selection results, each selection result being an one-of-k selection result, the method comprising:
    (a) selecting a plurality of multiplication factors, the multiplication factors being power-of-two multiplication factors and the sum of the multiplication factors being equal to k;
    (b) selecting a first selection result as a first input value;
    (c) selecting a second selection result as a second input value;
    (d) shifting using an ALU (arithmetic-logic unit) shifter implemented in the integrated circuit the first input value towards the most significant bit by each of the plurality of multiplication factors to generate a plurality of shifted input values, each shifted input value being shifted towards the most significant bit by one of the plurality of multiplication factors;
    (e) adding using an ALU adder implemented in the integrated circuit the plurality of shifted input values and the second input value;
    (f) generating an address output value;
    (g) selecting the next selection result as the first input value;
    (h) selecting the address output value as the second input value; and
    (i) repeating the steps of (d) to (h) until all selection results have been selected,
    wherein the address output value generated by the addition of the last selection result and the address output value generated by shifting using the ALU shifter and adding using the ALU adder of all previous selection results is the address value having a contiguous address range.

2. The method of claim 1, wherein k is 12 and the plurality of multiplication factors comprises 8 and 4.

3. The method of claim 2, wherein shifting using an ALU (arithmetic-logic unit) shifter implemented in the integrated circuit the first input value towards the most significant bit by each of the plurality of multiplication factors to generate a plurality of shifted input values comprises:
    shifting using the ALU shifter the first input value towards the most significant bit by three places to generate a first shifted input value being a multiplied-by-8 value; and
    shifting using the ALU shifter the first input value towards the most significant bit by two places to generate a second shifted input value being a multiplied-by-4 value.

4. A method in an integrated circuit for generating an address value having a contiguous address range from a first selection result and a second selection result, each selection result being an one-of-k selection result, the method comprising:

selecting a plurality of multiplication factors, the multiplication factors being power-of-two multiplication factors and the sum of the multiplication factors being equal to k;

shifting using an ALU (arithmetic-logic unit) shifter implemented in the integrated circuit the first selection result towards the most significant bit by each of the plurality of multiplication factors to generate a plurality of shifted input values, each shifted input value being shifted towards the most significant bit by one of the plurality of multiplication factors;

adding using an ALU adder implemented in the integrated circuit the plurality of shifted input values and the second selection result; and generating an address output value being the address value having a contiguous address range by addition of the plurality of shifted input values and the second selection result.

5. The method of claim 4, wherein k is 12 and the plurality of multiplication factors comprises 8 and 4.

6. The method of claim 5, wherein shifting using an ALU (arithmetic-logic unit) shifter implemented in the integrated circuit the first selection result towards the most significant bit by each of the plurality of multiplication factors to generate a plurality of shifted input values comprises:

shifting using the ALU shifter the first selection result towards the most significant bit by three places to generate a first shifted input value being a multiplied-by-8 value; and shifting using the ALU shifter the first selection result towards the most significant bit by two places to generate a second shifted input value being a multiplied-by-4 value.

7. A circuit in an integrated circuit for generating an address value having a contiguous address range from a plurality of selection results, each selection result being an one-of-k selection result, the circuit comprising:

one or more computation stages, each computation stage receiving a first input value and a second input value and generating an output value, each computation stage comprising an arithmetic-logic unit (ALU) shifter and an arithmetic-logic unit (ALU) adder, wherein the ALU shifter applies a plurality of shifting operations to the first input value based on a plurality of multiplication factors, each multiplication factors being power-of-two multiplication factors and the sum of the multiplication factors being equal to k, the ALU shifter generating a plurality of shifted input values, each shifted input value being shifted towards the most significant bit by one of the plurality of multiplication factors, and wherein the ALU adder adds the plurality of shifted input values and the second input value to generate the output value; and the one or more computation stages comprising a first computation stage for receiving a first selection result and a second selection result as the first and second input values, wherein the second to last computation stages, if any, each receives the next selection result as the first input value and the output value of the previous computation stage as the second input value, wherein the output value of the only or the last computation stage is the address value having a contiguous address range.

8. The circuit of claim 7, wherein k is 12 and the plurality of multiplication factors comprises 8 and 4.

9. The circuit of claim 8, wherein the ALU shifter shifts the first input value towards the most significant bit by three places to generate a first shifted input value being a multiplied-by-S value and shifts the first input value towards the most significant bit by two places to generate a second shifted input value being a multiplied-by-4 value.

* * * * *

UNITED STATES PATENT AND TRADEMARK OFFICE
CERTIFICATE OF CORRECTION

| | | |
|---|---|---|
| PATENT NO. | : 7,676,537 B2 | Page 1 of 1 |
| APPLICATION NO. | : 11/237165 | |
| DATED | : March 9, 2010 | |
| INVENTOR(S) | : Peter Chambers | |

It is certified that error appears in the above-identified patent and that said Letters Patent is hereby corrected as shown below:

Column 18,
Line 33, Claim 9, where "by-S value" should read "by-8 value"

Signed and Sealed this
Twenty-second Day of February, 2011

David J. Kappos
*Director of the United States Patent and Trademark Office*